United States Patent
Sakai et al.

(10) Patent No.: US 6,704,129 B2
(45) Date of Patent: Mar. 9, 2004

(54) OPTICAL SCANNING APPARATUS CAPABLE OF REDUCING VARIATIONS IN SHADING AND IMPROVING LIGHT USAGE

(75) Inventors: Kohji Sakai, Tokyo (JP); Yoshinori Hayoshi, Kawasaki (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/791,407

(22) Filed: Feb. 22, 2001

(65) Prior Publication Data

US 2001/0055140 A1 Dec. 27, 2001

Related U.S. Application Data

(60) Division of application No. 09/324,077, filed on Jun. 1, 1999, now Pat. No. 6,229,638, which is a continuation-in-part of application No. 09/031,410, filed on Feb. 26, 1998, now abandoned.

(30) Foreign Application Priority Data

Apr. 28, 1997 (JP) ............................... 9-122879

(51) Int. Cl.[7] ............................................. G02B 26/08
(52) U.S. Cl. ........................ 359/212; 359/216; 359/900
(58) Field of Search ................. 359/196–226, 359/900, 738–740; 347/241, 243, 137, 258–261

(56) References Cited

U.S. PATENT DOCUMENTS

| 5,355,244 A | 10/1994 | Suzuki et al. | 359/212 |
|---|---|---|---|
| 5,610,647 A | 3/1997 | Takada | 347/137 |
| 5,657,146 A | 8/1997 | Choi et al. | 359/205 |
| 5,680,242 A | 10/1997 | Ando | 359/196 |
| 5,701,191 A | 12/1997 | Iwasaki | 359/205 |

FOREIGN PATENT DOCUMENTS

| JP | 5-303049 | 11/1993 |
|---|---|---|
| JP | 10-325933 | 12/1998 |

*Primary Examiner*—James Phan
(74) *Attorney, Agent, or Firm*—Greenberg Traurig LLP; Eugene C. Rzucidlo; Joseph M. Manak

(57) ABSTRACT

An optical scanning apparatus reduces shading and variations in light intensity and significantly increases light usage during an optical scanning process using a simple construction in which a laser beam from a light source is deflected by a light deflector having a reflective surface and is focused to a spot upon a scanning surface by a scanning lens to thereby perform optical scanning. The light source is arranged to produce a laser beam which includes both P-polarized light and S-polarized light. A direction of polarization of the light source is inclined in a plane perpendicular to the optical axis with respect to both the deflecting direction (the Y-axis direction) and a direction perpendicular to the deflecting direction (Z-axis direction). The laser beam impinges upon the reflective surface as polarized light which is between P-polarized light and S-polarized light, such that shading is minimized and variations in light intensity are significantly reduced and light usage is greatly increased during the optical scanning process.

10 Claims, 15 Drawing Sheets

Θ=45deg

Θ=45deg

Θ=67.5deg

50%

Θ=22.5deg

50%

Θ=45deg

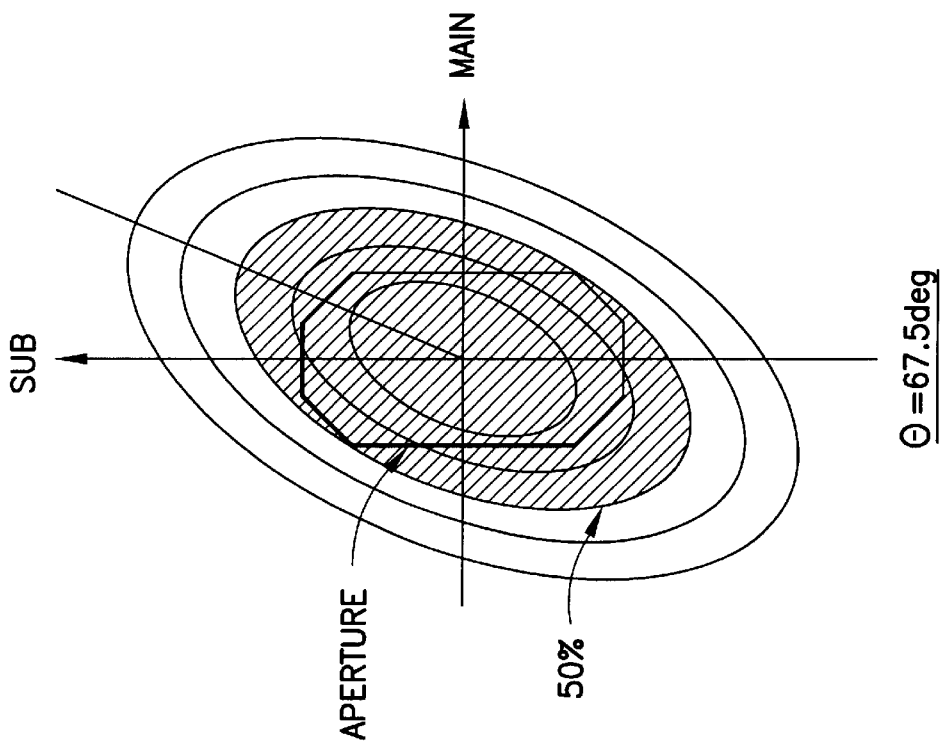
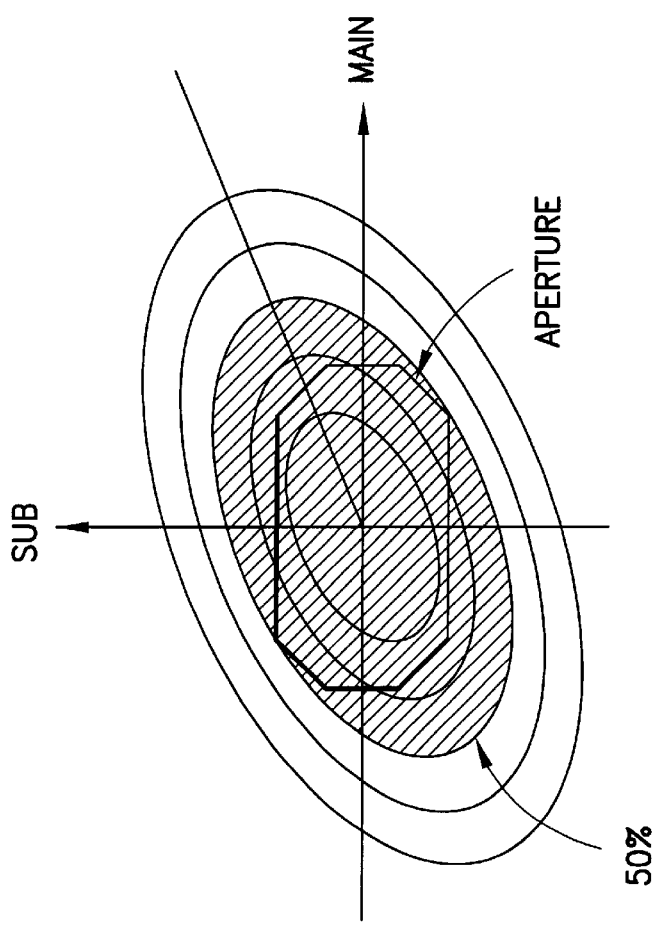
FIG.10b  Θ=67.5deg
FIG.10a  Θ=22.5deg

OPTICAL SCANNING APPARATUS CAPABLE OF REDUCING VARIATIONS IN SHADING AND IMPROVING LIGHT USAGE

This application is a Division of U.S. application Ser. No. 09/324,077, filed Jun. 1, 1999, U.S. Pat. No. 6,229,638, which is a Continuation-In-Part of U.S. patent application Ser. No. 09/031,410 which was filed on Feb. 26, 1998, abandoned, the teachings of which are incorporated herein in their entirety by reference.

BACKGROUND OF THE INVENTION

1. Field of the Invention

The present invention relates to a laser beam optical scanning device for writing data on an optical recording medium preferably for use in a variety of devices including a digital copying machine, a laser printer, an optical disk, and, in particular, to an optical scanning device that is capable of reducing variations in shading and increase light usage during a scanning process.

2. Description of the Related Art

An optical scanning device for scanning a scanning surface aligned with the surface of an optical recording medium, such as a photosensitive material, is well known in relation to laser printers or the like. In an optical scanning device, a usual optical arrangement is such that a laser beam from a laser beam source is deflected by a light deflector, such as a rotating polygon mirror, and applied to the scanning surface as a light spot by a scanning lens. Thus, the incident angles of the laser beam on the reflective surface of the light deflector and on the scanning lens are caused to continuously vary during line scanning in the main scanning direction.

Reflectance of the deflecting reflective surface and reflectance and transmittance of the surface of the scanning lens vary in correspondence with the respective incident angles, so that the intensity of the light spot on the scanning surface generally fluctuates with an image height in the main scanning direction, resulting in an unevenness in image density in the line scanning or a deterioration in gradation. This phenomenon, which is referred to as "shading", is serious when the direction of polarization of the laser beam impinging upon the deflecting reflective surface is parallel with or perpendicular to the deflecting direction. Generally, the light intensity tends to be reduced or increased at either end in the main scanning direction with respect to the central image height in the main scanning direction.

To overcome this problem, a filter which has a transmittance distribution has conventionally been used in such an optical system to compensate for the variation in the intensity of light of the scanning line. However, there are limitations to the acceptable size and position of the filter. Further, use of such a filter results in an increase in cost of the optical scanning apparatus.

Japanese Patent Laid-Open No. 5-303049 proposed a construction in which a ¼ wavelength plate is arranged in the optical path between the light source and the light deflector. Due to this construction, the polarization of the beam impinging upon the light deflector is converted to circularly polarized light, and reflectance of the reflective surface of the light deflector is kept substantially constant within the deflecting region, whereby a reduction in shading is realized.

However, the above-described construction uses a ¼ wavelength plate, which is expensive, resulting in an increase in the production cost of the optical scanning device itself.

SUMMARY OF THE INVENTION

To overcome the problems described above, the preferred embodiments of the present invention provide an optical scanning device having a very simple construction which significantly reduces shading, and significantly improves reflectance and light usage.

In accordance with a preferred embodiment of the present invention, an optical scanning device includes a light source, which generates a laser beam, a light deflector for deflecting the laser beam in a light deflection direction, and a scanning lens for focusing the deflected laser beam at a spot on a scanning surface to thereby perform optical scanning, wherein the light source, the deflector, and the scanning lens are located along an optical axis, and the light source is tilted relative to the optical axis by an angle of about 17.5° to about 27.5° or by an angle of about 62.5° to 72.5°, and generates the laser beam, such that the laser beam, which is impinged on the reflective surface, is light polarized in a direction between a direction that is parallel to the light deflection direction and a direction that is perpendicular to the light deflection direction.

Thus, instead of using an arrangement of a light source which produces only a P-polarized light or only an S-polarized light, the preferred embodiments of the present invention arrange a light source relative to an optical axis so as to produce a laser beam which includes a combination of P-polarized light and S-polarized light and minimizes the effect of a plurality of disadvantageous conditions. As will be described below, this arrangement of the light source and the resulting laser beam including a combination of P-polarized light and S-polarized light significantly minimizes shading and reduces variations in light intensity, while also maximizing light usage, during a scanning operation.

The above-described preferred embodiment preferably includes an aperture located between the light source and the deflector. The aperture preferably has a length that is larger than a width, where the length extends in a direction of a major axis of an ellipsoid shaped light beam output by the light source at a location of the aperture. Also, the aperture in this preferred embodiment preferably has a substantially rectangular shape or may have a substantially square shape.

In order to further maximize light usage, as described in more detail below, the corners of the aperture may be cut so as to define oblique angles relative to sides of the aperture.

According to another preferred embodiment, an optical scanning apparatus includes a light source generating a laser beam, a deflector having a reflective surface arranged relative to the light source to deflect the laser beam via the reflective surface in a light deflection direction, a scanning lens arranged relative to the deflector to focus the deflected laser beam at a spot on a scanning surface to thereby perform optical scanning and an aperture located between the light source and the deflector, the aperture having a substantially square shape, wherein the light source, the deflector and the scanning lens are located along an optical axis and the light source is tilted relative to the optical axis by an angle of about 45°, and generates the laser beam such that the laser beam which is impinged on the reflective surface is light polarized in a direction between a direction that is parallel to the light deflection direction and a direction that is perpendicular to the light deflection direction.

As with the previously described preferred embodiment, this arrangement also significantly minimizes shading and reduces variations in light intensity, while maximizing light usage, during a scanning operation The arrangement of the light source and the apertures described with respect to the above preferred embodiments achieves an excellent combination of elements and arrangement thereof which provides an extremely improved laser beam including P-polarized light and S-polarized light to produce the significant reduction in shading and variation in light intensity, while maximizing light usage.

The above-mentioned light source may be an edge-emitting type laser diode. In addition, the light source may have an array structure including a plurality of light emitting sections each disposed on a common substrate and capable of independently effecting optical modulation.

These and other features, advantages and elements of the present invention will be apparent from the following detailed description of the preferred embodiments with reference to the accompanying drawings as described below.

BRIEF DESCRIPTION OF THE DRAWINGS

FIG. 4b is a diagram illustrating a relationship between a light polarizing direction and shading which is produced on the scanning surface for values of angle θ shown in FIG. 4a;

FIG. 5b is a diagram illustrating a relationship between a light polarizing direction and shading which is produced on the scanning surface for values of angle θ shown in FIG. 5a;

FIG. 10a is a diagram showing light usage amount when an aperture having a rectangular shape including cut corner portions and an angle of tilt θ=22.5° according to a preferred embodiment of the present invention;

FIG. 10b is a diagram showing light usage amount when an aperture having a rectangular shape including cut corner portions and an angle of tilt θ=67.5° according to a preferred embodiment of the present invention;

FIG. 11b is a graph of light distribution relative to an optical axis for a preferred embodiment of the invention in which an aperture includes cut corner portions as shown in FIG. 9 which eliminates the side lobes shown in FIG. 11a;

DETAILED DESCRIPTION OF PREFERRED EMBODIMENTS

Preferred embodiments of the present invention will now be described with reference to the attached drawings.

Figure 1:
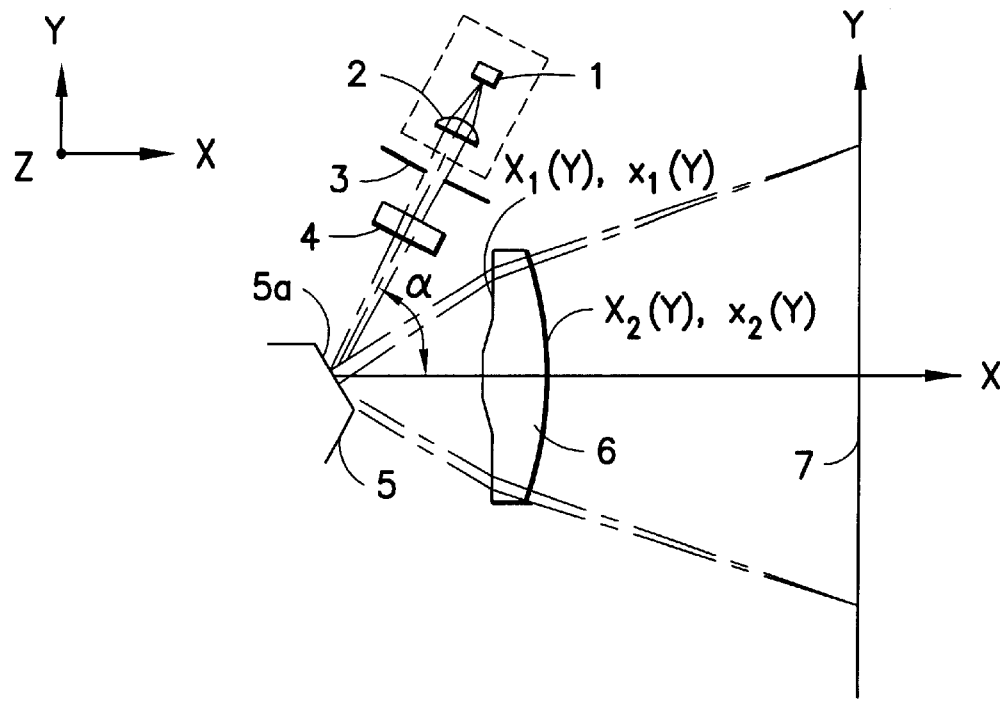
FIG. 1 is a top view showing an optical scanning apparatus according to a preferred embodiment of the present invention.

FIG. 1 is a diagram showing an optical scanning device in accordance with a preferred embodiment of the present invention. In FIG. 1, a preferred optical scanning apparatus includes a light source 1 for generating a laser beam which is to be used in a scanning process as will be described in detail below. A collimator lens 2 is arranged close to the light source 1 for shaping a laser beam emitted from the light source 1 into a parallel beam. It should be noted that in one preferred embodiment of the present invention, the light source 1 and the collimator 2 are integrally formed in a unitary body. Such an integral unit including the light source 1 and the collimator 2 allows for easier handling, initial assembly and replacement.

An aperture 3 and a cylindrical lens 4 through which the laser beam collimated by the collimator lens 2 is transmitted and which forms a line image elongated in a main scanning direction in the vicinity of a reflective surface 5a of a light deflector 5. The laser beam transmitted through the cylindrical lens 4 impinges upon the light deflector 5 and is deflected so that the light impinges upon an optical scanning lens 6 and is focused to a spot on a scanning surface 7 by the action of the optical scanning lens 6 to perform optical scanning on the scanning surface 7 in the main scanning direction (the Y-axis direction).

In FIG. 1, the angle α defined by the optical axis of the components of the optical system located before the deflector and the optical axis of the components of the optical system located after the deflector is preferably about 60°. X1(Y) and X2(Y) indicate the profiles in the plane of deflection of the first and second surfaces, respectively, of the scanning lens 6 in the direction of the laser beam propagation (that is, the configuration as shown in FIG. 1). Both of the first and second surfaces of the scanning lens 6 as indicated by the profiles X1(Y) and X2(Y) have an aspheric profile, which can be expressed, for example, as follows: assuming that the coordinate in the direction of the optical axis is X, the coordinate in the direction perpendicular to the optical axis is Y, the paraxial radius of curvature is R, and the higher-order coefficients are A, B, C, D, . . . , the following equation holds true:

$$X = \frac{Y^2}{\left\{R + \frac{\sqrt{1-(1-K)Y^2}}{R^2}\right\}} + A*Y^4 + B*Y^6 + C*Y^8 + D*Y^{10} + \ldots$$

Figures 2A, 2B:
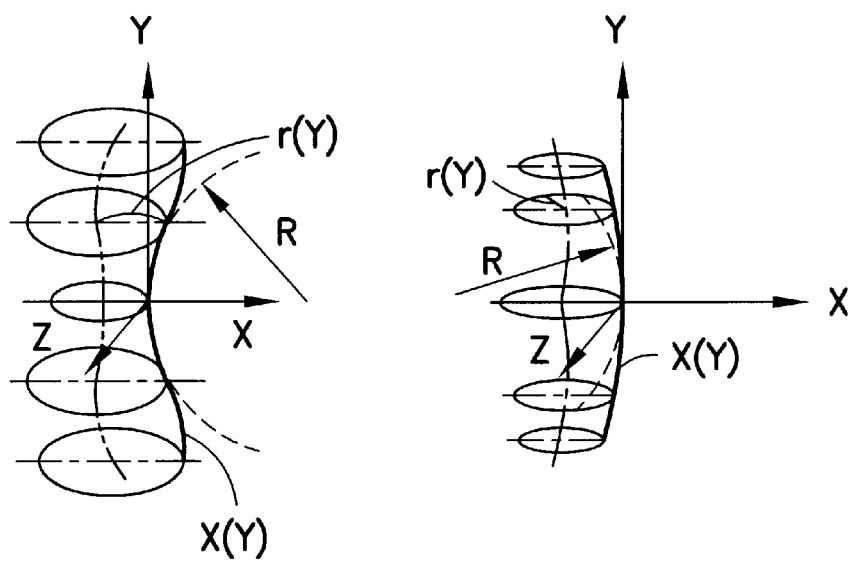
FIG. 2(a) is a diagram illustrating a profile of a first surface of an optical scanning lens according to a preferred embodiment of the present invention.
FIG. 2(b) is a diagram illustrating a profile of a second surface of an optical scanning lens according to a preferred embodiment of the present invention.

Further, in the preferred embodiment shown in FIG. 1, the optical scanning lens 6 constitutes the scanning image formation lens itself, and establishes a conjugate relationship in a geometric-optic manner between the position where the line image is formed and the scanning surface 7 with respect to a sub-scanning direction (the Z-axis direction in FIG. 1). Further, it is shaped so as to satisfactorily compensate for the curvature of field in the sub-scanning direction. Thus, the first and second lens surfaces are "toric surfaces" as shown in FIGS. 2(a) and 2(b).

The profiles of the surfaces of the optical scanning lens 6 with respect to the sub-scanning direction are indicated by $X_1(Y)$ and $X_2(Y)$, as shown in FIG. 1.

In the plane of deflection, the paraxial radius of curvature of the first and second lens surfaces are indicated by R1 and R2, and the refractive index of the lens material is indicated by N. Specifically, in this preferred embodiment, the scanning lens has the following characteristics.

$R_1$=160.3, $K_1$=−58.38,
$A_1$=−9.22923E-07, $B_1$=3.65515E-10,
$C_1$=−8.34355E-14, $D_1$=1.113E-17,
$R_2$=−139.3, $K_2$=4.83,
$A_2$=−9.71348E-07, $B_2$=2.37E-10,
$C_2$=−8.06014E-14, $D_2$=2.65E-17.

The sub-scanning radius of curvature can be expressed by the following equation.

$$rs(y)=r_s(0)+a\bullet Y_2+b\bullet Y_4+c\bullet Y_6+d\bullet Y_8+e\bullet Y_{10}+f\bullet Y_{12}+\bullet\bullet\bullet$$

And, the sub-scanning radius of curvature preferably has the following characteristics.

rs1(0)=−108.6, $a_1$=7.803E-02,
$b_1$=−3.15051E-04, $c_1$=8.16834E-07,
$d_1$=−1.10138E-09, $e_1$=7.352E-13,
$f_1$=−1.8802E-16
rs2(0)=−15.09, $a_2$=−2.00512E-03,
b2=3.17274E-06, $c_2$=−4.04628E-09,
d2=5.72209E-12, $e_2$=−4.22019E-15,
f2=1.24827E-18.

Characteristics indicated in Table 1 below are also satisfied by the scanning lens used in the preferred embodiment.

TABLE 1

| i | R1 | d1 | N |
|---|---|---|---|
| 0 |  | 33.2 |  |
| 1 | 160.3 | 13.5 | 1.51933 |
| 2 | −139.3 | 128.3 |  |

Figure 3A:
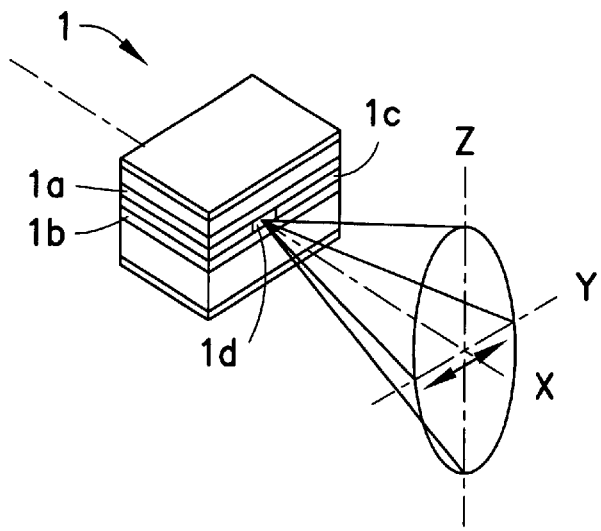
FIG. 3(a) is a diagram illustrating a conventional arrangement of an end surface emission type laser diode in which the active layer of the laser diode coincides with a light deflecting direction.
Figure 3B:
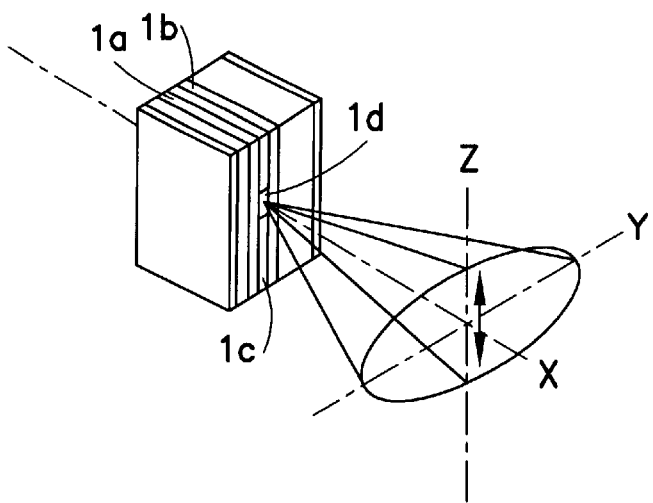
FIG. 3(b) is a diagram illustrating another conventional end surface emission type laser diode in which the active layer of the laser diode is perpendicular to a light deflecting direction.
Figure 3C:
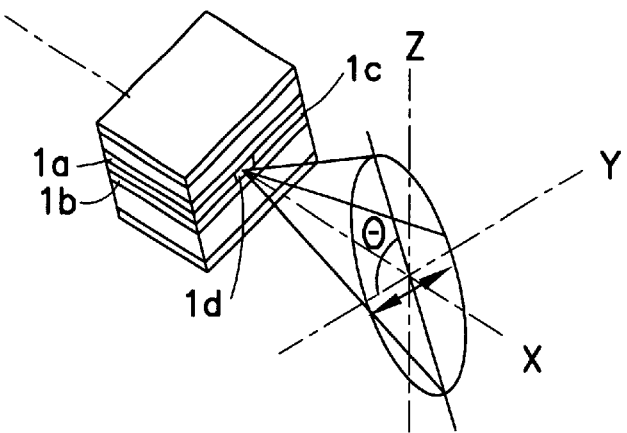
FIG. 3(c) is a diagram illustrating an arrangement of an end surface emission type laser diode according to a conventional device in which the active layer of the laser diode is inclined at an angle of 45° with respect to both a light deflecting direction.
Figure 4A:
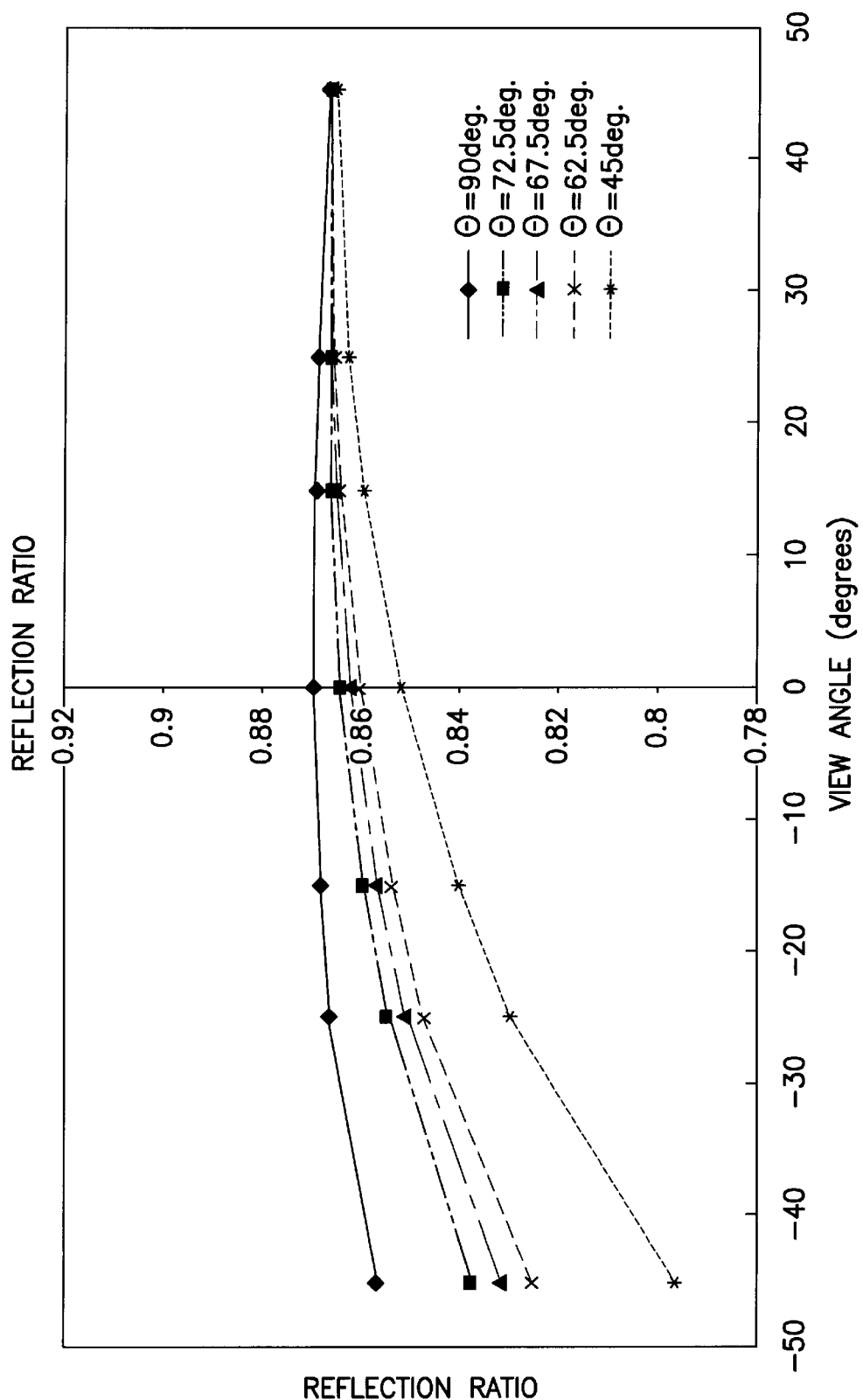
FIG. 4a is a diagram illustrating a relationship between a light polarizing direction and a reflectance of a reflective surface of a scanning surface upon which the light from a light source is impinged for various values of angle θ including a range of 62.5° to 72.5° according to a preferred embodiment of the present invention.
Figure 4B:
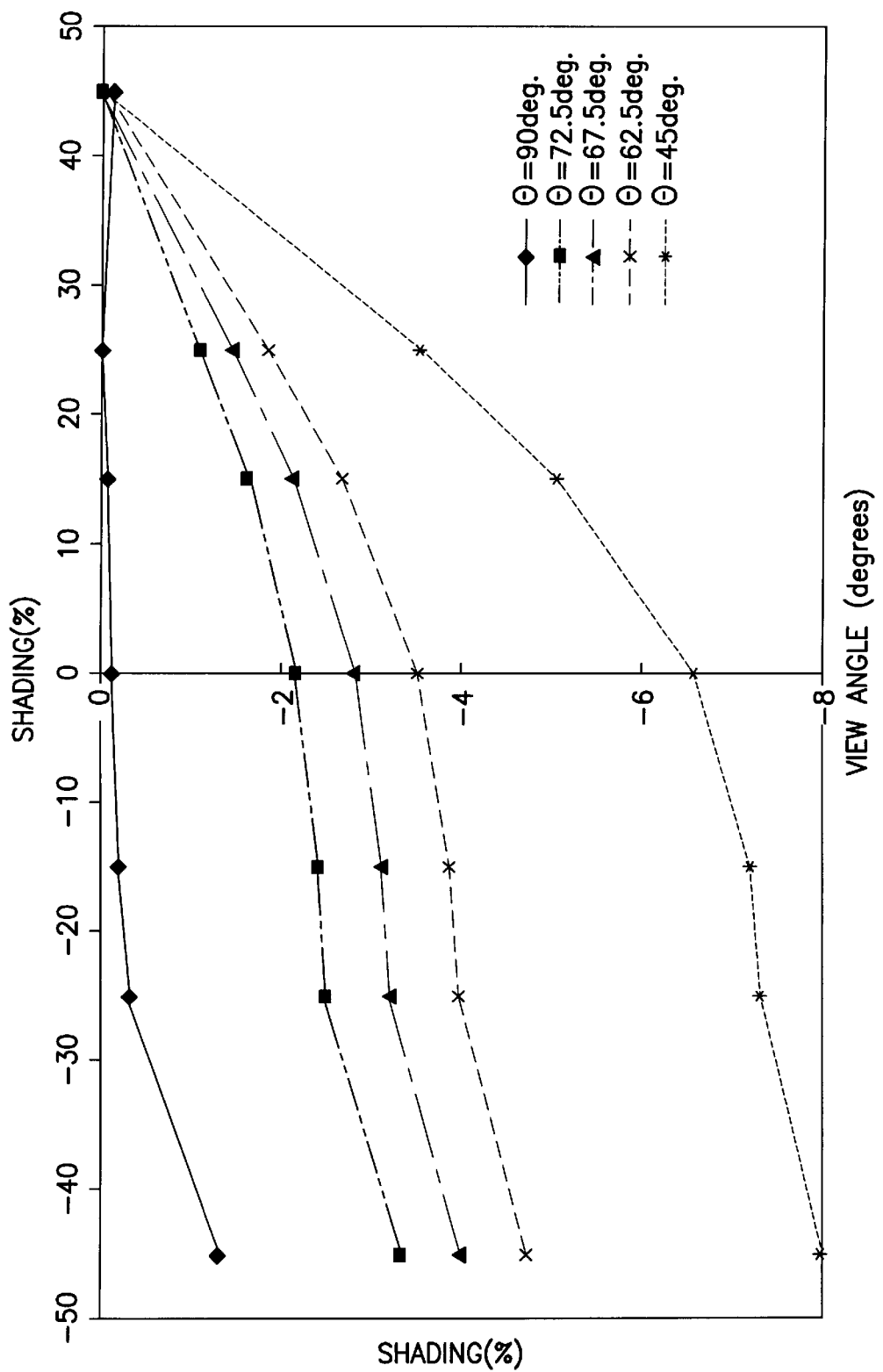
Figure 5A:
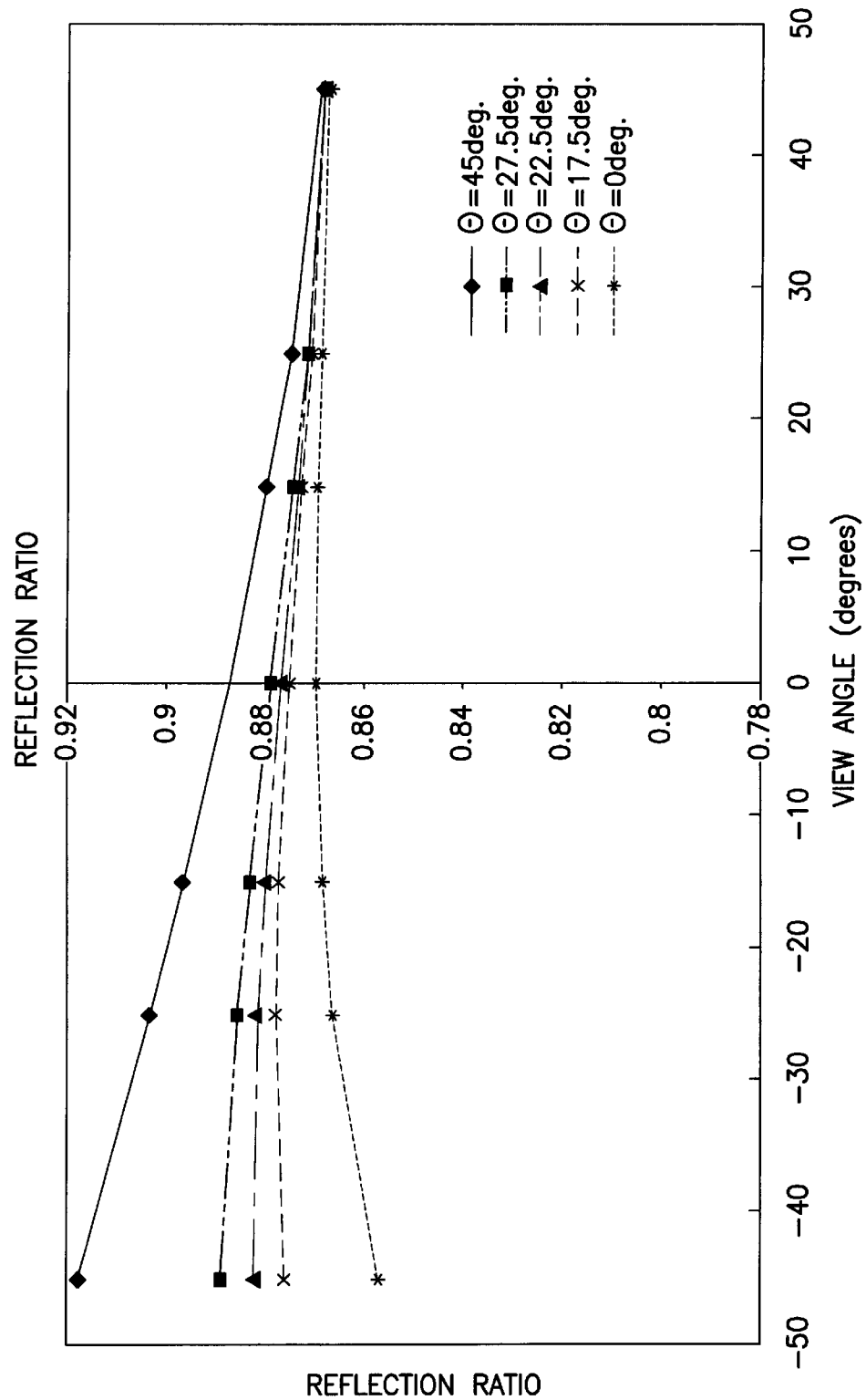
FIG. 5a is a diagram illustrating a relationship between a light polarizing direction and a reflectance of a reflective surface of a scanning surface upon which the light from a light source is impinged for various values of angle θ including a range of 17.5° to 27.5° according to another preferred embodiment of the present invention.
Figure 5B:
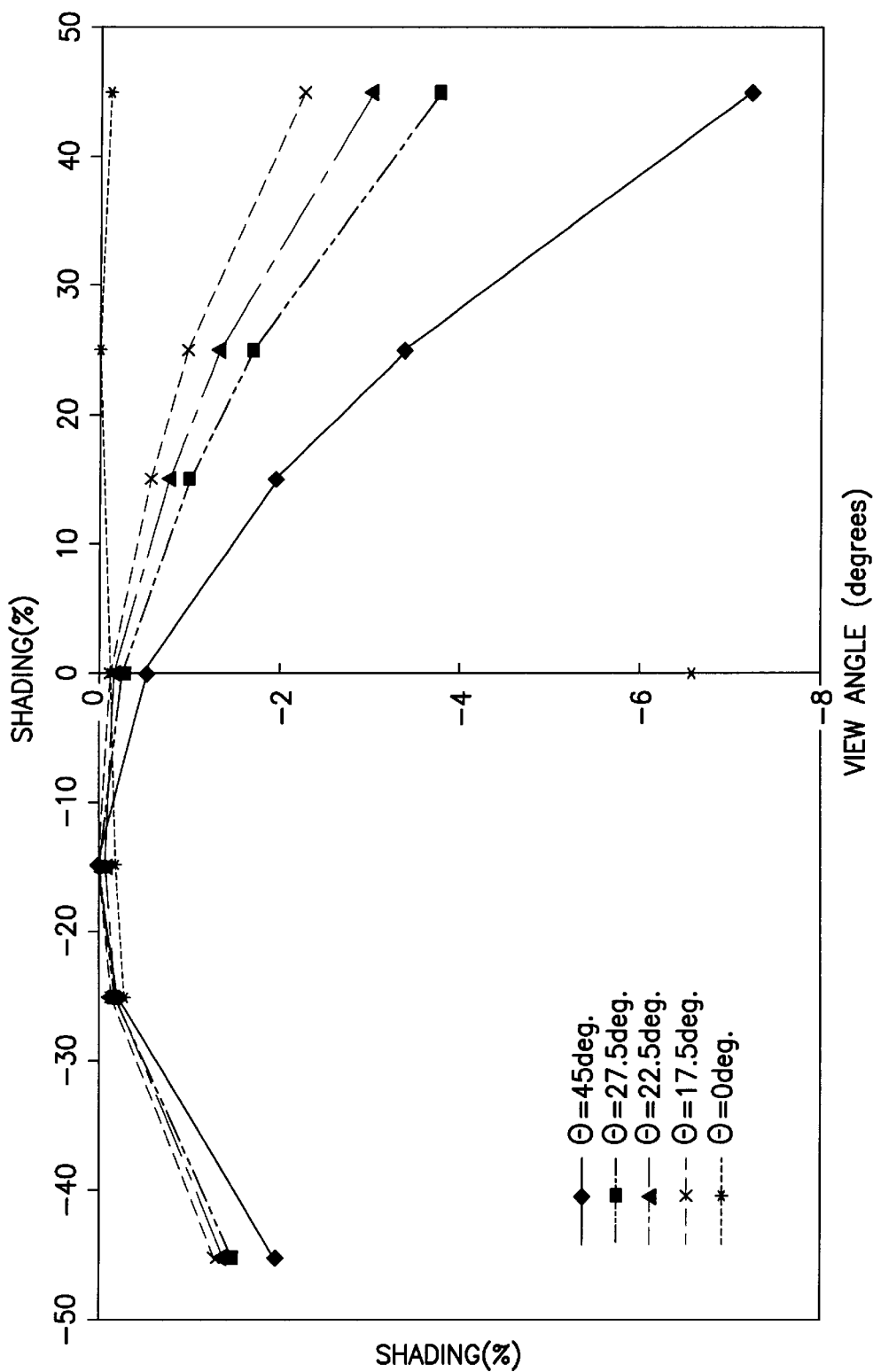

FIGS. 3(a), 3(b) and 3(c) show conventional arrangements of light sources.

The light source shown in FIGS. 3(a)–3(c) is an edge-emitting type laser diode in which an active layer 1c is placed between two cladding layers 1a and 1b. The direction of polarization of the laser beam emitted from such an edge-emitting type laser diode is generally parallel to the active layer 1c.

In the first conventional arrangement shown in FIG. 3(a), the active layer 1c of the laser coincides with the light deflecting direction of the light deflector 5 (the Y-axis direction). In the second conventional arrangement shown in FIG. 3(b), the active layer 1c of the laser coincides with a direction perpendicular to the light deflecting direction of the light deflector 5 (the Y-axis direction).

In the third conventional arrangement shown in FIG. 3(c), the active layer 1c of the laser is inclined at a specific angle with respect to both the light deflecting direction (the Y-axis direction) and the direction perpendicular to the light deflecting direction (the Z-axis direction). More specifically, the laser is rotated by an angle θ=45° around the optical axis. Numeral 1d indicates the oscillation region in the active layer 1c.

The thick direction lines with arrows at either end thereof shown in FIGS. 3(a) through 3(c) indicate the respective polarization directions of each of the arrangements shown therein. Polarization of the laser beam in the conventional arrangements of FIGS. 3(a) and 3(b) are referred to as P-polarized and S-polarized light, respectively, relative to the reflective surface 5a of the light deflector 5.

The reflective surface 5a of the light deflector 5 preferably includes Al (aluminum) coated with SiO which is formed to have thickness of λ/2 wherein λ=780 nm, and the optical scanning lens is preferably uncoated. Under these conditions, reflectance of the reflective surface 5a of the light deflector 5 and shading of the scanning surface 7 were measured.

FIGS. 4a, 4b, 5a and 5b show reflectance and shading, respectively, with the light source being arranged as shown in FIGS. 3(a) through 3(c) at angles of θ=90° (FIG. 3a), $\theta=0°$ (FIG. 3b) and $\theta=45°$. Also, shown in FIGS. 4a, 4b, 5a and 5b are reflectance shading when the light source is arranged at angles of $\theta=17.5°$, $\theta=22.5°$, $\theta=27.5°$, $\theta=45°$, $\theta=62.5°$, $\theta=67°$ and $\theta=72.5°$ according to preferred embodiments of the present invention.

As is apparent from FIGS. 4a, 4b, 5a and 5b, when the P-polarized laser beam impinges upon the light deflector 5, reflectance decreases as the angle of view decreases, and shading of the scanning surface 7 decreases as the image height decreases. When the S-polarized laser beam impinges upon the light deflector 5, reflectance decreases as the angle of view increases, and shading of the scanning surface 7 decreases as the image height increases.

When the light source 1 is rotated by an angle $\theta=45°$ around the optical axis, as shown in FIG. 3(c), the direction of polarization of the beam impinging upon the reflective surface 5a of the light deflector 5 is located directly between the P-polarized light and the S-polarized light. Although as is seen in viewing FIG. 3(c), the arrangement of the light source emits a laser beam which is impinged on the reflective surface so as to include P-polarized light and S-polarized light (FIG. 3(c)) and so that the laser beam impinges on the reflective surface at a substantially perpendicular orientation relative to the reflective surface, this only addresses the shading and reflectance problem. That is, the angle of $\theta=45°$ was determined in the conventional device shown in FIG. 3(c) to be idea for providing good values for shading and reflectance.

However, it was not previously known that the $\theta=45°$ creates significant problems with light usage. That is, although $\theta=45°$ produces good reflectance and shading results, this angle causes problems with light usage, as will be explained in more detail later.

Thus, the prior art, shown in FIGS. 3(a), 3(b) and 3(c) only recognized that angles of $\theta=0°$, $\theta=45°$ and $\theta=90°$ could be used, and did not recognize any problems with using a value of 45° for $\theta$.

However, as is seen in FIGS. 4a, 4b, 5a and 5b and also with respect to FIGS. 7a and 7b described later, changing the angle $\theta$ to values of from about 17.5 to 27.5 and from about 62.5 to about 72.5, each of the problems of shading, reflectance and light usage are addressed in an extremely effective and successful manner. More specifically, by using angles of $\theta$ equal to from about 17.5 to 27.5 and from about 62.5 to about 72.5, reflectance and shading are very good as seen in FIGS. 4a, 4b, 5a and 5b, and also the light usage is excellent as seen in FIGS. 7a and 7b.

Figure 6B:
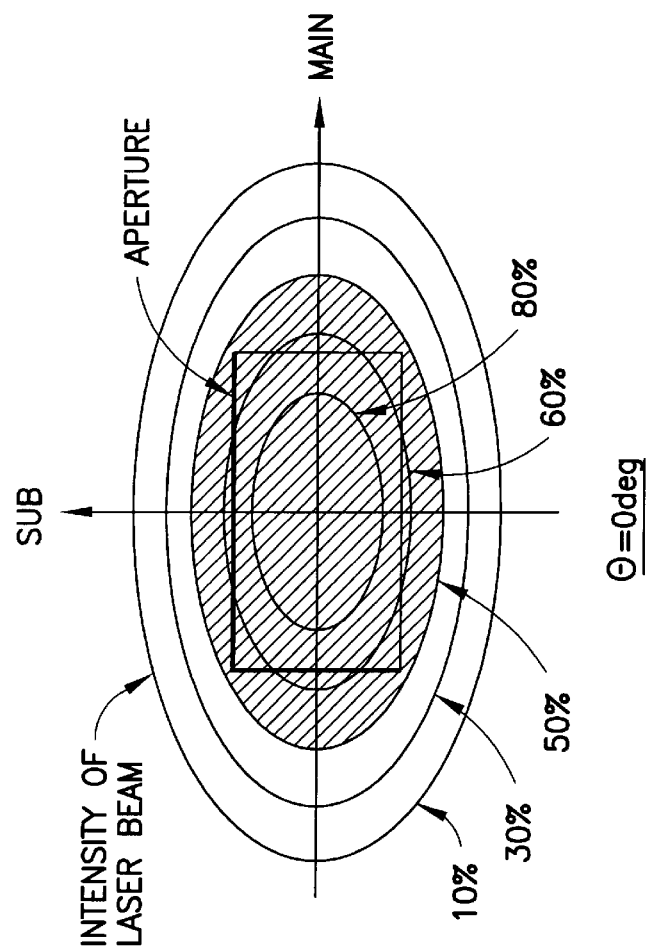
FIG. 6b is a diagram showing light usage amount when an aperture having a rectangular shape and an angle of tilt θ=0° according to a comparative example which was prepared for comparison to preferred embodiments of the present invention.
Figure 6A:
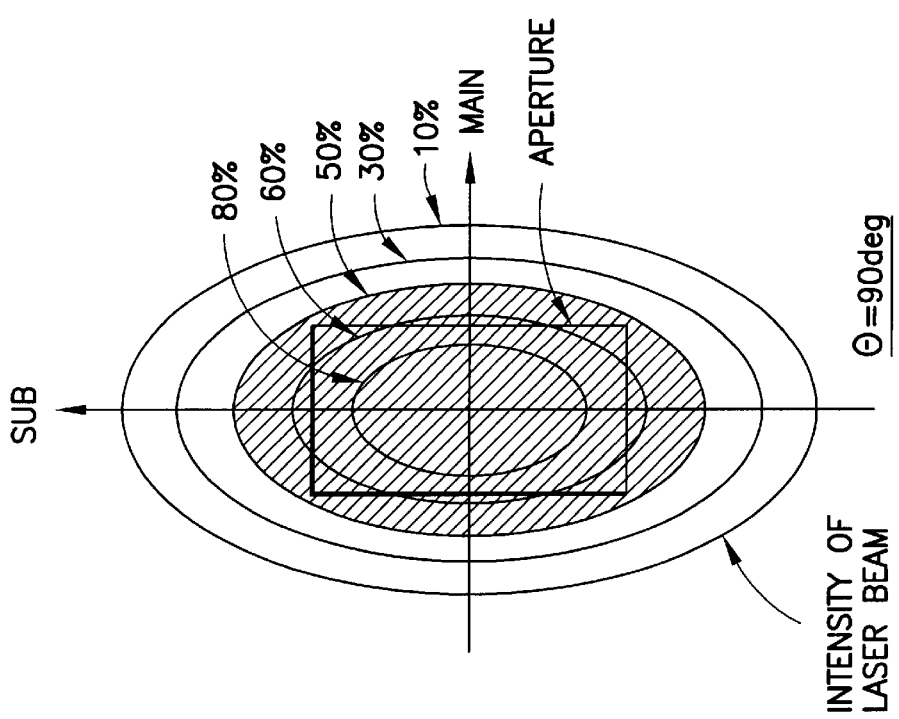
FIG. 6a is a diagram showing a light usage amount when an aperture having a rectangular shape and an angle of tilt θ=90° according to a comparative example which was prepared for comparison to preferred embodiments of the present invention.
Figure 6D:
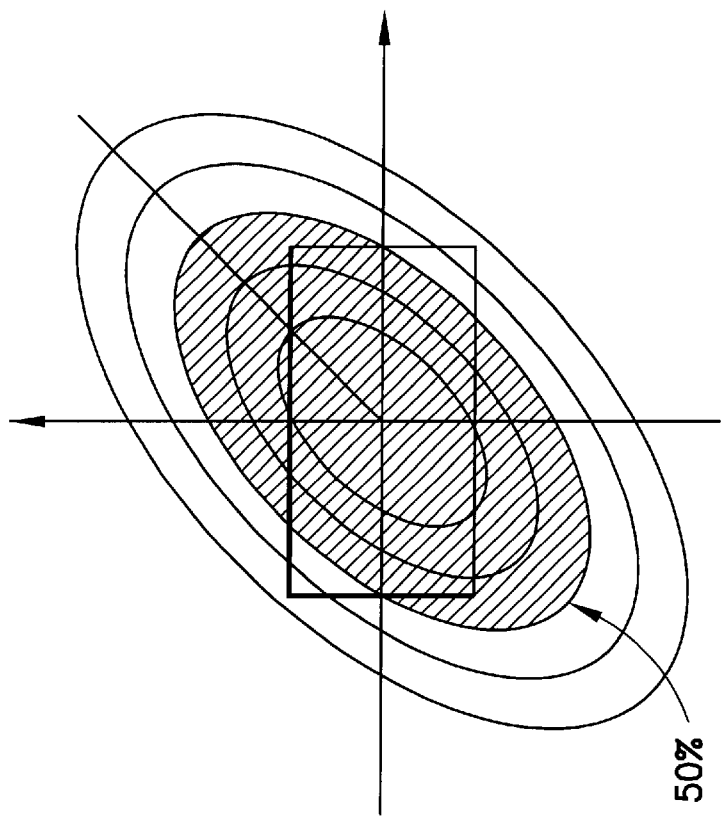
FIGS. 6c and 6d are diagrams showing light usage amount when an aperture having a rectangular shape and an angle of tilt θ=45° according to a comparative example which was prepared for comparison to preferred embodiments of the present invention.
Figure 6C:
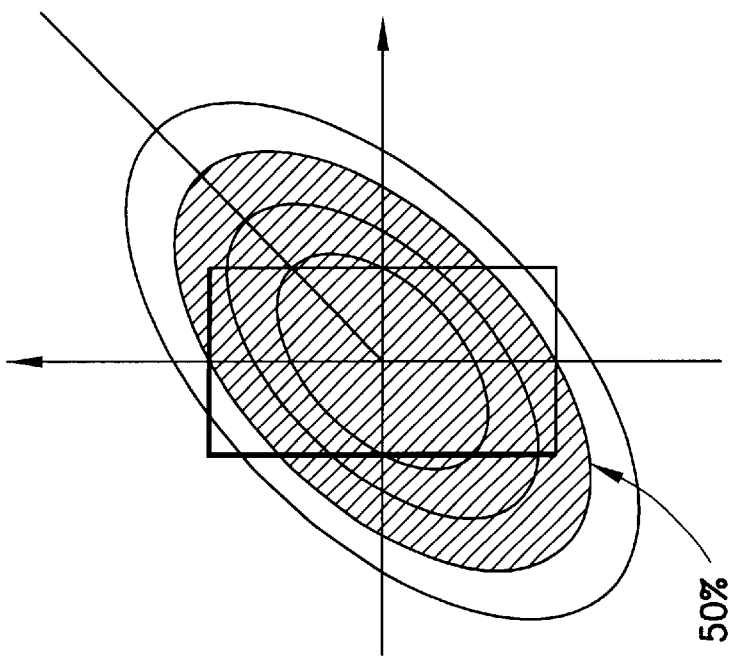
Figure 7B:
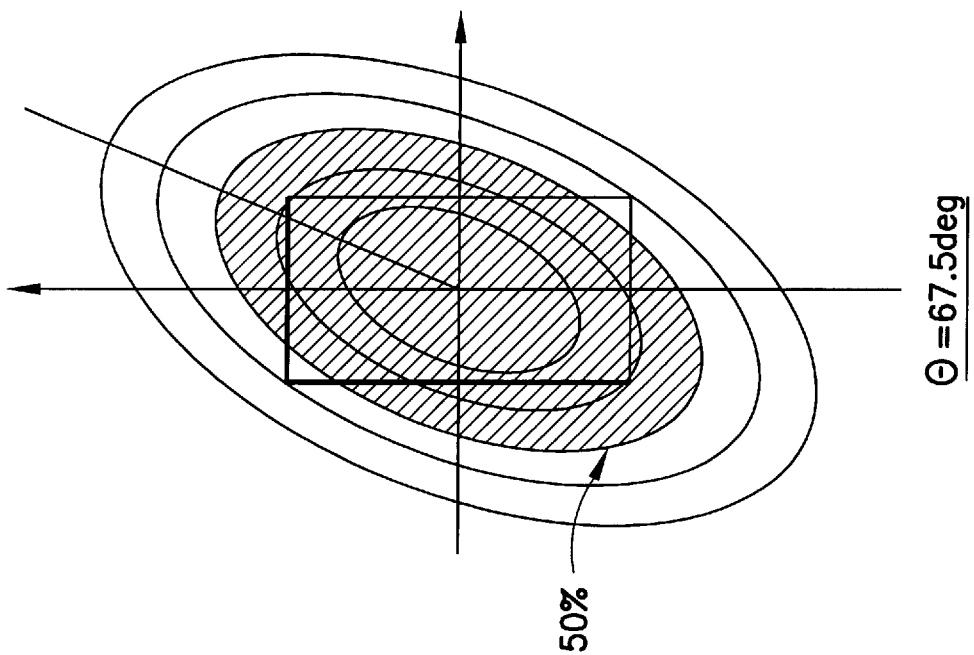
FIG. 7b is a diagram showing light usage amount when an aperture having a rectangular shape and an angle of tilt θ=67.5° according to a preferred embodiment of the present invention.
Figure 7A:
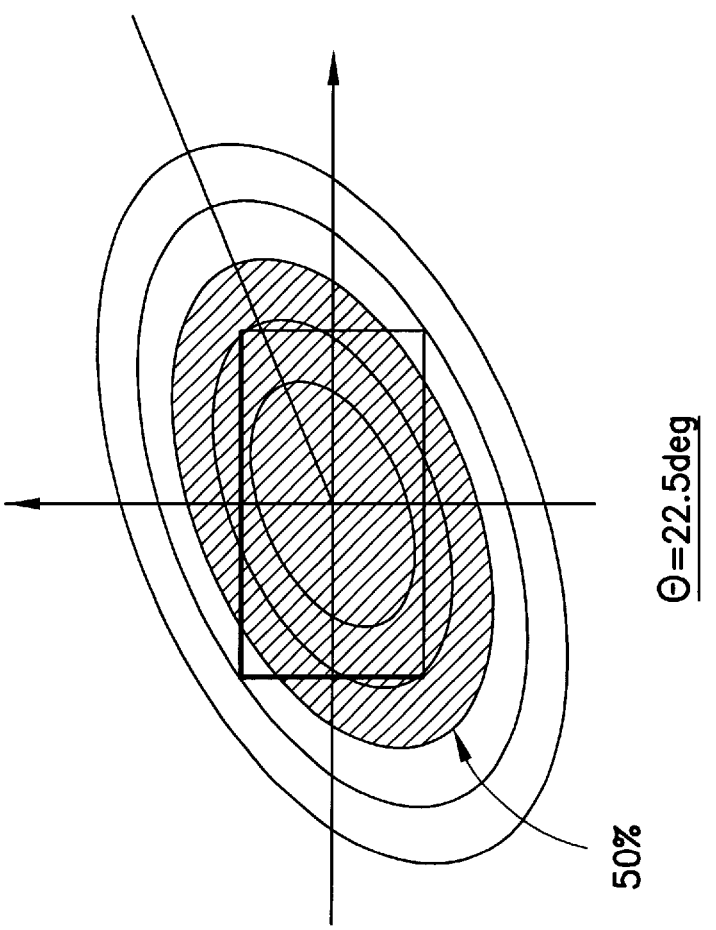
FIG. 7a is a diagram showing light usage amount when an aperture having a rectangular shape and an angle of tilt θ=22.5° according to a preferred embodiment of the present invention.

To see the differences in light usage, comparative examples shown in FIGS. 6a, 6b, 6c, and 6d were prepared for comparison to the results achieved with preferred embodiments of the present invention shown in FIGS. 7a and 7b.

As seen in FIG. 6a, a rectangular aperture is used and $\theta=90°$. Light usage is very good as seen by the fact that the periphery of the aperture is located completely within the beam spot. However, as seen in FIGS. 4a, 4b, 5a and 5b, reflectance and shading are very poor when $\theta=90°$.

As seen in FIG. 6b, a rectangular aperture is used and $\theta=0°$. Light usage is very good as seen by the fact that the periphery of the aperture is located completely within the beam spot. However, as seen in FIGS. 4a, 4b, 5a and 5b, reflectance and shading are very poor when $\theta=0°$.

As seen in FIGS. 6c and 6d, a rectangular aperture is used and $\theta=45°$. Although as seen in FIGS. 4a, 4b, 5a and 5b, reflectance and shading are good when $\theta=45°$, light usage is very poor as seen by at least two large corner or peripheral areas of the aperture are located outside of the beam spot.

In order to maximize the quality of shading, reflectance and light usage, the angle $\theta$ is changed to values of from about 17.5° to 27.5° and from about 62.5° to about 72.5° as described above. As seen in FIGS. 7a and 7b, the light usage is very good when $\theta=22.5°$ and when $\theta=72.5°$, and as seen in FIGS. 4a, 4b, 5a and 5b, the shading and reflectance are also very good when $\theta=22.5°$ and when $\theta=72.5°$.

It should be noted that while the values of angle $\theta=22.5°$ and $\theta=72.5°$ are the most preferred for achieving an excellent combination of high quality shading, reflectance and light usage, other values of angle $\theta$ from about 17.5 to 27.5 and from about 62.5 to about 72.5 can be used and still achieve very high quality of each characteristic of shading, reflectance and light usage.

Figure 9:
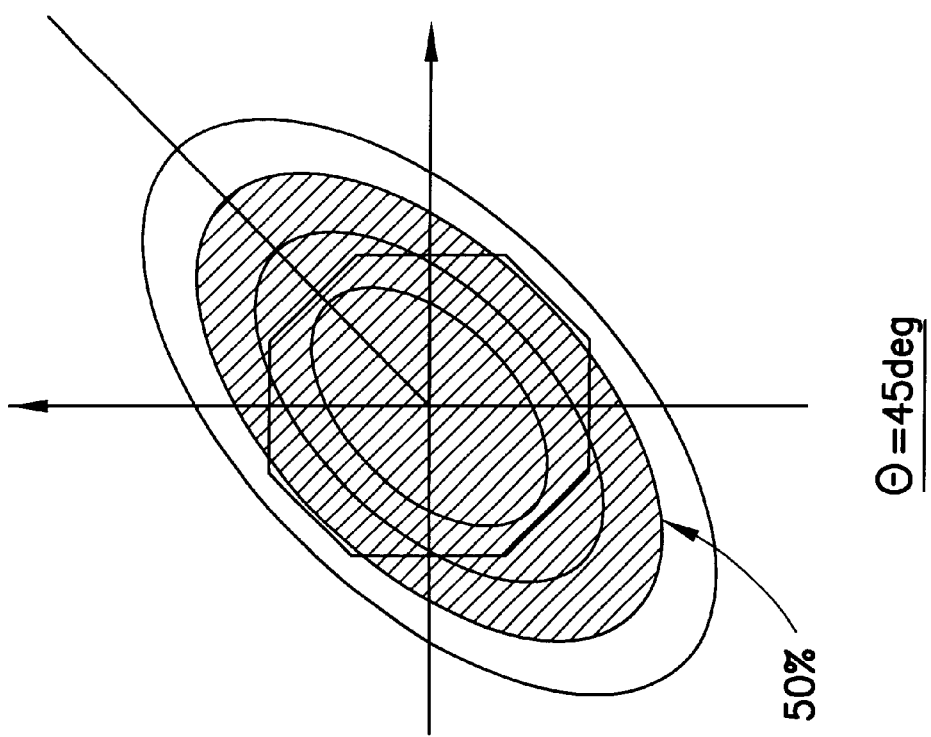
FIG. 9 is a diagram showing light usage amount when an aperture having a square shape including cut corner portions and an angle of tilt θ=45° according to a preferred embodiment of the present invention.

In the preferred embodiments shown in FIGS. 7a and 7b, the shape of the aperture is preferably rectangular. A square shaped aperture may be used in another preferred embodiment of the present invention shown in FIG. 9. As seen in FIG. 9, when using a square shaped aperture, the angle $\theta$ preferably has a value of 45° so that the shading and reflectance are very good as seen in FIGS. 4a, 4b, 5a and 5b and so that the light usage is also very good as seen in FIG. 9.

Figure 8B:
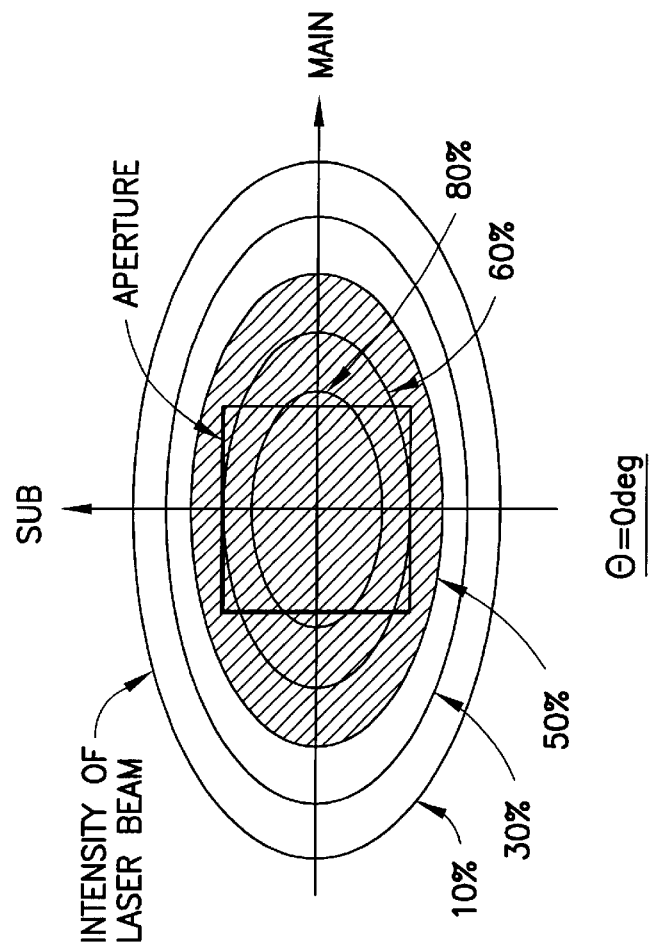
FIG. 8b is a diagram showing light usage amount when an aperture having a square shape and an angle of tilt θ=0° according to a comparative example which was prepared for comparison to preferred embodiments of the present invention.
Figure 8A:
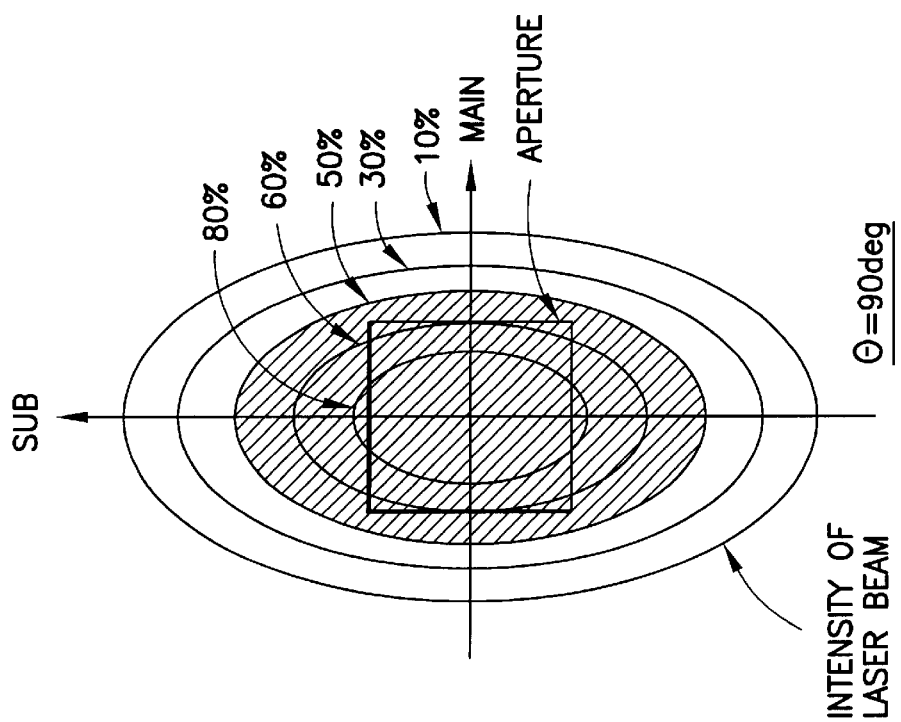
FIG. 8a is a diagram showing light usage amount when an aperture having a square shape and an angle of tilt θ=90° according to a comparative example which was prepared for comparison to preferred embodiments of the present invention.

Compare the excellent results achieved in the preferred embodiment shown in FIG. 9 with those of the comparative examples shown in FIGS. 8a and 8b. Although light usage is good in FIGS. 8a and 8b, where $\theta$ has a value of 90 and 0 degrees, respectively, the shading and reflectance are very poor when $\theta$ has a value of 90 and 0 as described above.

Figure 11B:
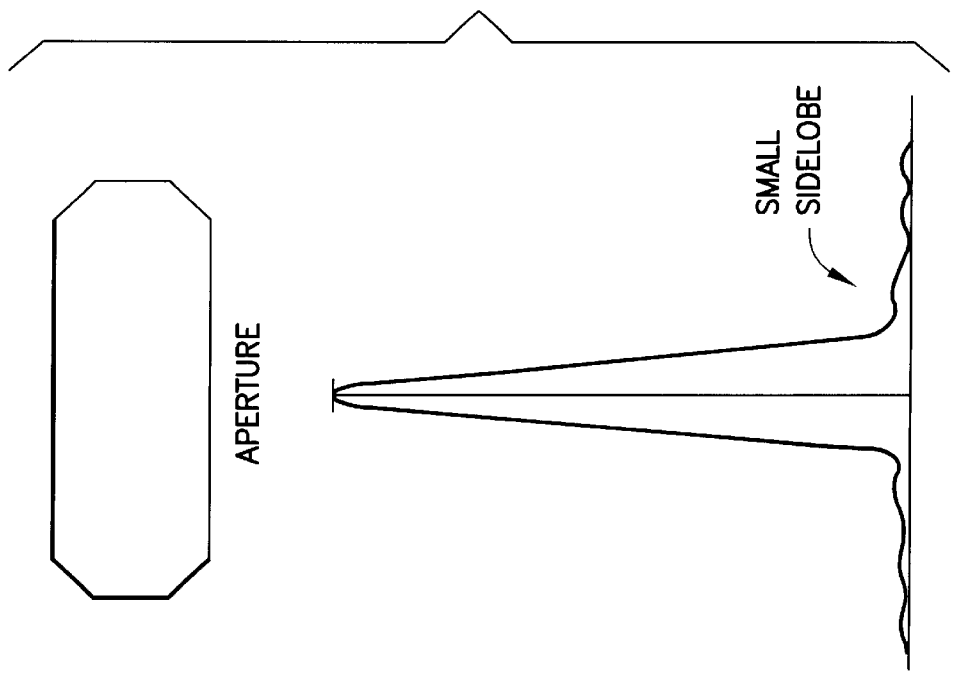
Figure 11A:
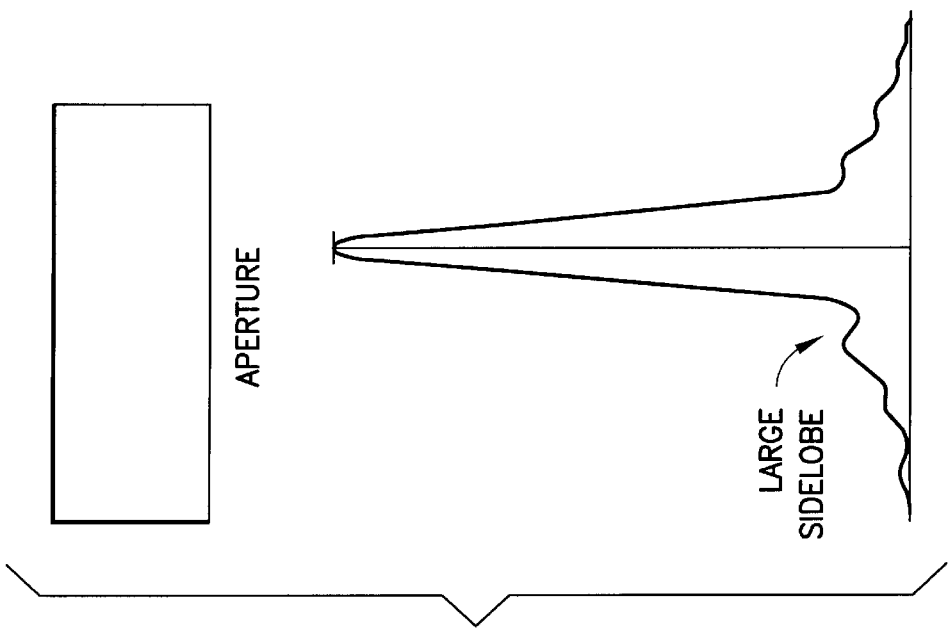
FIG. 11a is a graph of light distribution relative to an optical axis for a conventional device showing the condition of side lobes being created.

In another preferred embodiment shown in FIGS. 10a and 10b, a substantially rectangular aperture is used and $\theta$ has a value of about 22.5° and about 67.5°, respectively. However, in order to provide excellent quality of shading, reflectance and light usage, while also eliminating a side lobe problem shown in FIG. 11a, the aperture preferably has cut corner portions. More specifically, at least two and preferably four of the corner portions of the substantially rectangular aperture are cut so as to define oblique angles relative to the longer and shorter sides of the substantially rectangular aperture. As seen in FIGS. 10a and 10b, the cut corner portions improve light usage even further and as seen in FIG. 11b, eliminates the side lobe problem which occurs in FIG. 11a.

Figure 13:
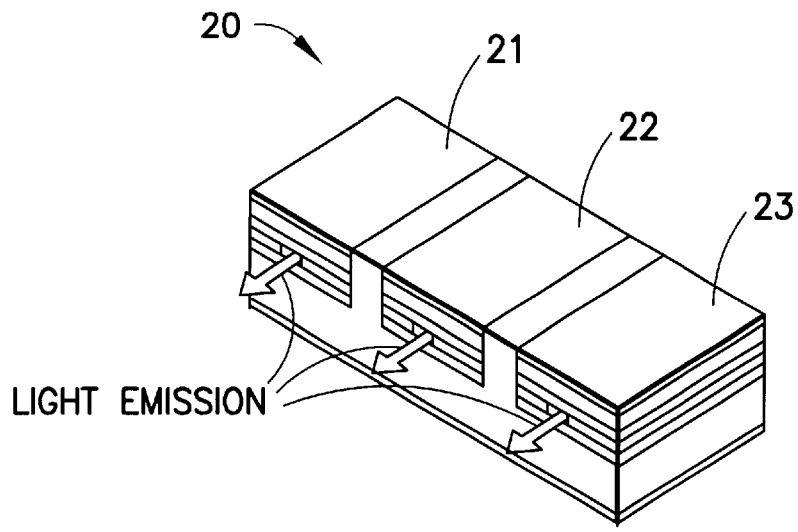
FIG. 13 is a perspective view depicting a light source used in a preferred embodiment of the present invention, the light source having a plurality of laser diodes disposed in an array structure.

While in the above-described preferred embodiments a single laser beam is used, the light source 1 may be a monolithic semiconductor 20 in which a plurality of laser diodes 21, 22, and 23 are arranged in a row in a single chip, for example, as shown in FIG. 13. By using such a light source, it is possible to write data on the scanning surface 7 through a plurality of scanning lines at one time, thereby achieving an increase in writing speed and resolution of written data.

As is the case in the above-described preferred embodiments, when the light source comprises a semiconductor having a plurality of light emission points, the direction of polarization of the emitted laser beam is inclined relative to the optical axis with respect to the deflecting direction of the light deflector and the direction perpendicular to the deflecting direction so that the direction of the laser beam impinging upon the reflective surface 5a of the light deflector 5 may be between the P-polarized light and the S-polarized light and include a combination thereof preferably at an angle $\theta$ having a value of about 17.5° to 27.5° or about 62.5° to about 72.5°. As a result, it is possible to make shading substantially constant within the scanning range of the scanning surface. Thus, it is possible to obtain a satisfactory image having no variation in light intensity, while also maximizing light usage.

Figure 12:
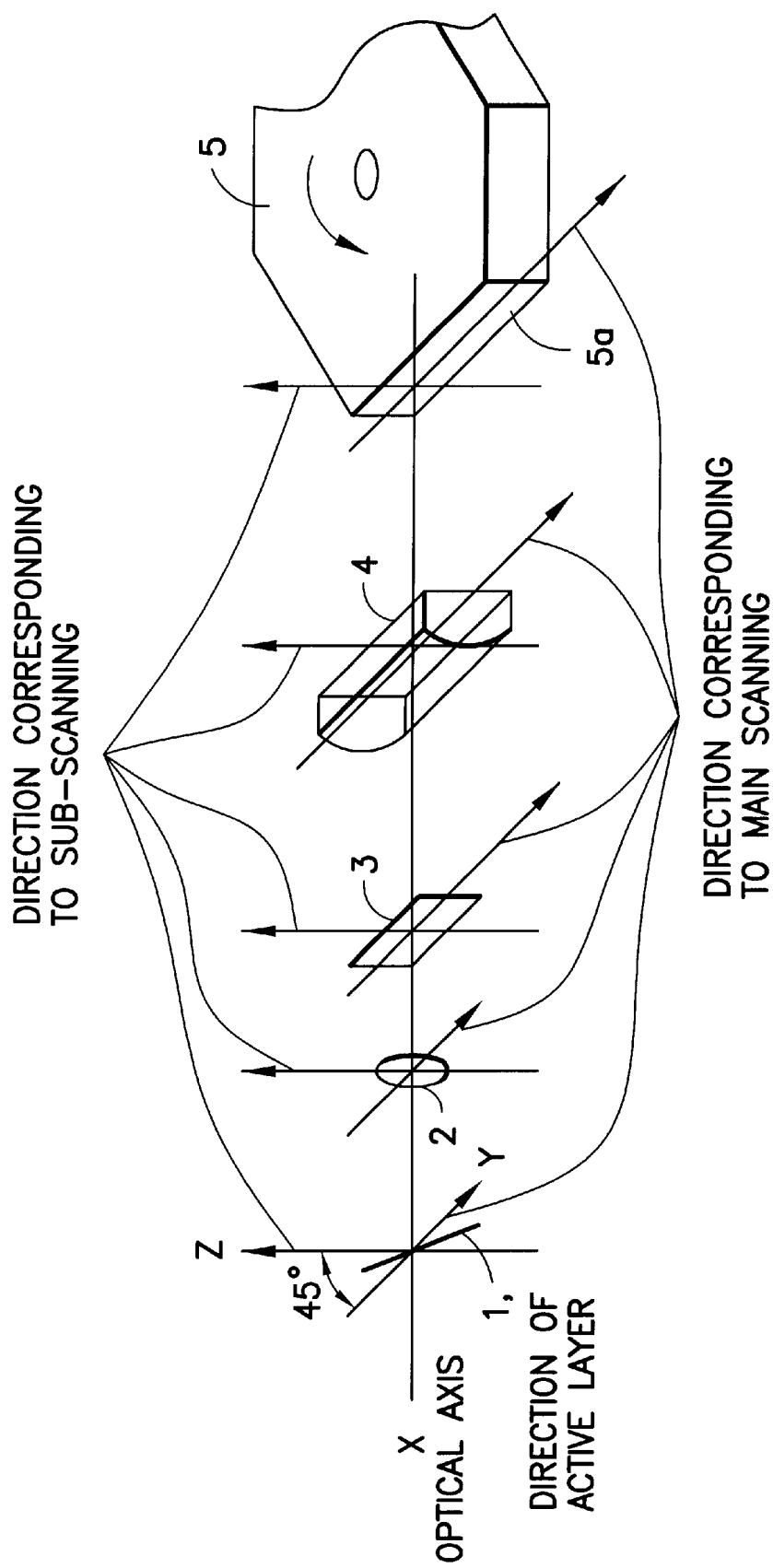
FIG. 12 is schematic perspective view showing a construction of a portion of a preferred embodiment of the present invention from the light source to the reflective surface of a scanning surface upon which light from the light source is impinged.

Generally, assuming that the deflecting direction of the reflective surface 5a of the light deflector 5 is the main scanning direction (the Y-axis direction) and that the direction perpendicular thereto is the sub-scanning direction (the Z-axis direction), the optical system from the light source 1 to the light deflector (the collimator lens 2, the aperture 3 and the cylindrical lens 4 in the case of FIG. 1) is preferably arranged, as schematically shown in FIG. 12, so as to be symmetrical with respect to each of the directions. In order that the direction of the laser beam emitted from the light source 1 may be substantially between the P-polarized light and the S-polarized light as described with reference to the above-described preferred embodiments, the arrangement and inclination angle of the light source 1 is determined and set before use of the optical scanning apparatus such that the polarization direction of the laser beam is preferably about 17.5° to about 27.5° or about 62.5° to about 72.5° with respect to the main scanning direction and the sub-scanning direction.

When the light source 1 is an edge-emitting type laser diode, the direction of polarization of the emitted laser beam is generally parallel to the active layer, so that the light source 1 is preferably inclined such that the active layer is substantially at an angle 17.5° to about 27.5° or about 62.5° to about 72.5° with respect to both the main scanning and sub-scanning directions.

Figure 14:
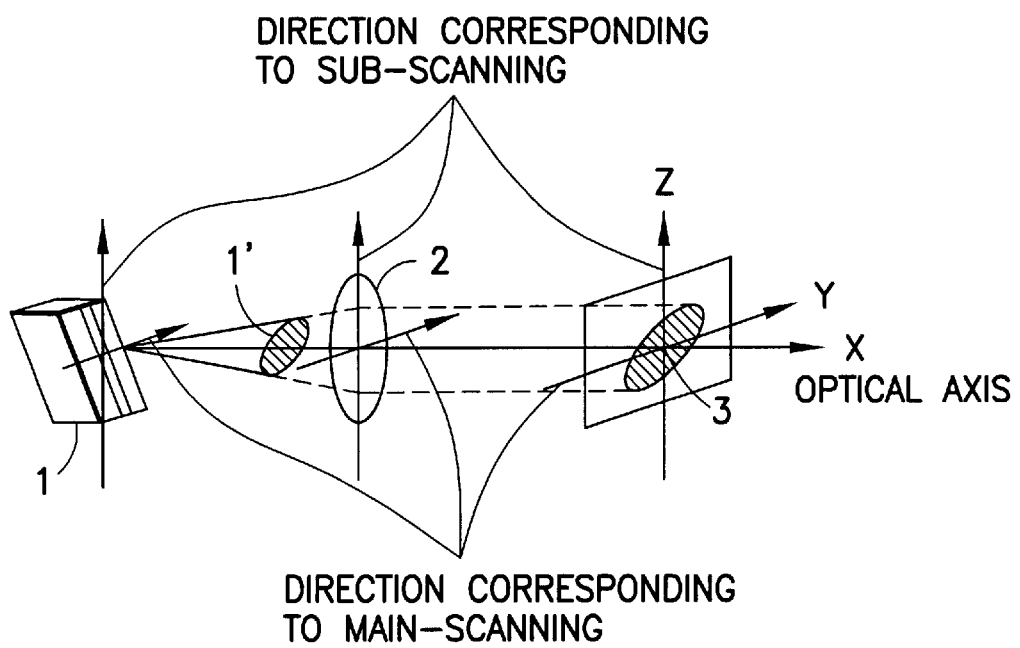
FIG. 14 is a diagram depicting how a light intensity distribution of a laser beam is defined by an aperture used in a preferred embodiment of the present invention.

When the light source is inclined as described above, the shape 1' of the output laser beam is also inclined as shown in FIG. 14. This may be the case when the edge emitting type laser diode, in particular, is used. In the case of the surface emitting type laser diode, since the oscillation region may be formed in any shape, it may be formed substantially as a circle, for example, so as not to affect the shape of the output laser beam even when the light source is inclined. However, generally, in the case of the edge-emitting type laser diode, the oscillation region is elongated in the direction of the active layer, so that the emitted laser beam has an elliptical shape elongated in a direction perpendicular to the direction of the active layer. Thus, when the active layer of the edge-emitting type laser diode is inclined, the laser beam has an inclined shape, and the light intensity distribution thereof is asymmetric relative to the directions respectively corresponding to the main scanning and sub-scanning directions.

To shape the asymmetric intensity distribution of the laser beam, the inner diameter of the aperture 3 is preferably made smaller than the size of the collimated laser beam 1' so that the beam spot on the scanning surface 7 becomes satisfactory, as shown in FIG. 14. The size and spot diameter of a laser beam preferably has a light intensity which is substantially equal to $1/e^2$ (which equals 0.135) of the maximum light intensity. Accordingly, the asymmetric intensity distribution of the laser beam may be sufficiently shaped when the inner diameter of the aperture 3 is included in an area which is set to be $1/e^2$ of the central intensity of the collimated laser beam 1', as is the case of the aperture 3 shown in FIG. 16.

As described above, in accordance with the present invention, there is provided an optical scanning device in which a laser beam from a light source is deflected by a light deflector having a reflective surface and is focused to a spot on a scanning surface by a scanning lens, wherein the light source is inclined at an angle having a value of about 17.5° to about 27.5° or about 62.5° to about 72.5°0 with respect to both the deflecting direction and a direction perpendicular to the deflecting direction in a plane perpendicular to the optical axis, whereby the laser beam from the light source impinges upon the reflective surface as a polarized light including P-polarized light and S-polarized light, thereby making it possible to provide maximum light usage while minimizing shading and to reduce variations in the light intensity of the image.

When the light source is in an array structure having a plurality of light emitting sections provided on the same substrate and which are arranged to independently effect light modulation, it is possible to write with a plurality of scanning lines at one time.

When the light source is equipped with an angle adjusting unit for adjusting the above-mentioned inclination, a polarization inclination angle of about 17.5° to about 27.5° or about 62.5° to about 72.5° can be achieved easily and reliably.

When an aperture is provided between the light source and the light deflector, and the inner diameter of the aperture is smaller than the diameter of an area determined to be $1/e^2$ of the central intensity of the laser beam, the beam can be easily controlled, and a desired beam diameter can be obtained on the scanning surface.

When the optical system from the light source to the aperture is formed as an integral light source unit, the angle of polarization can be easily adjusted, and the handling of the apparatus is facilitated.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical scanning apparatus, comprising:
   a light source generating a laser beam;
   a deflector having a reflective surface arranged relative to the light source to deflect the laser beam via the reflective surface in a light deflection direction; and
   a scanning lens arranged relative to the deflector to focus the deflected laser beam at a spot on a scanning surface to thereby perform optical scanning; wherein
   the light source, the deflector and the scanning lens are located along an optical axis and the light source is tilted relative to the optical axis by an angle of about 17.5° to about 27.5° and generates the laser beam such that the laser beam which is impinged on the reflective surface is light polarized in a direction between a direction that is parallel to the light deflection direction and a direction that is perpendicular to the light deflection direction.

2. The optical scanning apparatus according to claim 1, further comprising an aperture located between the light source and the deflector, wherein the aperture has a length that is larger than a width, where the length extends in a direction of a major axis of an ellipsoid shaped light beam output by the light source at a location of the aperture.

3. The optical scanning apparatus according to claim 1, further comprising an aperture located between the light source and the deflector, wherein the aperture has a substantially rectangular shape.

4. The optical scanning apparatus according to claim 3, wherein at least two corners of the aperture are cut to form oblique angles relative to sides of the substantially rectangular shaped aperture.

5. The optical scanning apparatus according to claim 3, wherein at least two corners of the aperture are cut so as to have curved cut portions relative to sides of the substantially rectangular shaped aperture.

6. The optical scanning apparatus according to claim 5, wherein at least two corners of the aperture are cut to define linear cut portions relative to sides of the substantially rectangular shaped aperture.

7. The optical scanning apparatus according to claim 3, wherein all four corners of the aperture are cut to form oblique angles relative to sides of the substantially rectangular shaped aperture.

8. The optical scanning apparatus according to claim 1, wherein the light source is an edge emitting type light source.

9. An image forming apparatus comprising:

a light source generating a laser beam;

a deflector having a reflective surface arranged relative to the light source to deflect the laser beam via the reflective surface in a light deflection direction; and a scanning lens arranged relative to the deflector to focus the deflected laser beam at a spot on a scanning surface to thereby perform optical scanning; wherein the light source, the deflector and the scanning lens are located along an optical axis and the light source is tilted relative to the optical axis by an angle of about 17.5° to about 27.5° and generates the laser beam such that the laser beam which is impinged on the reflective surface is light polarized in a direction between a direction that is parallel to the light deflection direction and a direction that is perpendicular to the light deflection direction.

10. A method of manufacturing an optical scanning apparatus comprising the steps of:

providing a light source generating a laser beam;

arranging a deflector having a reflective surface to deflect the laser beam via the reflective surface in a light deflection direction;

arranging a scanning lens to focus the deflected laser beam at a spot on a scanning surface to thereby perform optical scanning; and arranging an aperture between the light source and the deflector, the aperture having a substantially square shape; wherein the light source, the deflector and the scanning lens are located along an optical axis and the light source is tilted relative to the optical axis by an angle of about 17.5° to about 27.5° and generates the laser beam such that the laser beam which is impinged on the reflective surface is light polarized in a direction between a direction that is parallel to the light deflection direction and a direction that is perpendicular to the light deflection direction.

* * * * *